United States Patent [19]

Suga et al.

[11] Patent Number: 5,172,133
[45] Date of Patent: Dec. 15, 1992

[54] INK JET RECORDING WITH AN INK COMPOSITION CONTAINING PIGMENT

[75] Inventors: Yuko Suga, Tokyo; Hiromichi Noguchi, Atsugi; Megumi Saito, Kawasaki, all of Japan

[73] Assignee: Canon Kabushiki Kaisha, Tokyo, Japan

[21] Appl. No.: 751,785

[22] Filed: Aug. 29, 1991

[30] Foreign Application Priority Data

Aug. 31, 1990 [JP] Japan ................... 2-230270

[51] Int. Cl.$^5$ ................... B41V 2/05; C09D 11/02
[52] U.S. Cl. ................... 346/1.1; 106/20 D; 346/140 R
[58] Field of Search ............. 346/1.1, 140 R; 106/23, 106/20

[56] References Cited

U.S. PATENT DOCUMENTS 4,597,794 7/1986 Ohta et al. ................... 106/20

FOREIGN PATENT DOCUMENTS

| | | |
|---|---|---|
| 58-80368 | 5/1983 | Japan . |
| 61-200182 | 9/1986 | Japan . |
| 61-247774 | 11/1986 | Japan . |
| 61-272278 | 12/1986 | Japan . |
| 62-568 | 1/1987 | Japan . |
| 62-101671 | 5/1987 | Japan . |
| 62-101672 | 5/1987 | Japan . |
| 1-249869 | 10/1989 | Japan . |
| 1-301760 | 12/1989 | Japan . |

*Primary Examiner*—Joseph W. Hartary
*Attorney, Agent, or Firm*—Fitzpatrick, Cella, Harper & Scinto

[57] ABSTRACT

An ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the expression (I)

$$1.2 \times \frac{DAR}{100} \leq Wr/Wp \leq 15 \times \frac{DAR}{100} \quad (I)$$

wherein DAR denotes a value represented by the expression (II)

$$DAR = \frac{\text{Minimum weight of water-soluble resin necessary for dispersion of pigment}}{\text{Weight of pigment}} \times 100. \quad (II)$$

27 Claims, 4 Drawing Sheets

INK JET RECORDING WITH AN INK COMPOSITION CONTAINING PIGMENT

BACKGROUND OF THE INVENTION

1. Field of the Invention

The present invention relates to an ink suited for an ink-jet printer, an ink-jet device making use of it and an ink cartridge containing the ink. It also relates to an ink-jet recording process that makes a record on non-coated paper, called plain paper, by causing ink to fly from orifices of a recording head by the action of heat energy.

2. Related Background Art

Ink-jet recording systems have the advantages that they make less noise in the course of recording and a recorded image with a high resolution can be obtained at a high speed because of use of a highly integrated head. Inks used in such ink-jet recording systems are those prepared by dissolving various kinds of water-soluble dyes in water or in a mixed solution of water and an organic solvent. When the water-soluble dyes are used, however, light fastness of recorded images is often questioned because such water-soluble dyes have poor light fastness by nature.

Water resistance of recorded images is also often questioned because the ink is water-soluble. More specifically, if recorded images become wet with rain, sweat, or water from food and drink, they may become blurred or disappeared.

Meanwhile, similar questions have arisen also with respect to writing implements such as ball-point pens making use of dyes, and various water-based pigment inks for writing materials have been proposed so that the problems of light fastness and water resistance can be settled. Examples of studies on dispersion stability, prevention of ink solidification at pen points and prevention of ball wear of ball-point pens for the purpose of putting water-based pigment inks into practical use are seen in Japanese Patent Applications Laid-open No. 58-80368, No. 61-200182, No. 61-247774, No. 61-272278, No. 62-568, No. 62-101671, No. 62-101672, No. 1-249869, No. 1-301760, etc. Recently, ball-point pens or markers making use of water-based pigment inks have become commercially available.

When, however, conventional water-based pigment inks for writing implements are applied in an ink-jet recording apparatus of the system that makes a record by causing ink to fly from orifices of a recording head by the action of heat energy, there have been disadvantages such that serious difficulties may arise in ejection stability, causing defective prints. In particular, in a system that makes a record by ejecting droplets by the action of heat energy applied, use of the conventional pigment ink may cause the formation of deposits on a thin-film resistor because of the heat generated when pulses are applied to the ink, so that the ink may be imperfectly bubbled and the ejection of droplets can not respond to the applied pulses, often resulting in no ejection of ink. Namely, in order for an ink to be stably ejected from nozzle tips, the ink must have the performances that it can be bubbled on a thin-film resistor to form bubbles with the desired volume and also it can be repeatedly bubbled and debubbled at the desired intervals. None of conventional inks for writing implements, however, have satisfied such performances, and hence various difficulties as stated above may occur when loaded in an ink-jet recording apparatus to carry out recording.

Moreover, although some conventional water-based pigment inks have a good performance when ejected for a relatively short time, but such inks experienced problems such that ejection becomes unstable when drive conditions of a recording head are changed or ink is continuously ejected over a long period of time, finally resulting in no ejection.

As a water-based pigment ink that can be preferably used in the above ink-jet recording, EP 0376284 A2 discloses an ink characterized by having a superior ejection performance in ink-jet printers, response to variations of their drive conditions, stability in continuous ejection for a long period of time and restoration performance at the time of reprint after temporary stop of printing, and being particularly suited for ink-jet printers making use of heat energy. This ink, however, is required to be more improved in its anti-sedimentation during long-term storage of ink, the stability in ink properties, and the response to higher-speed drive.

SUMMARY OF THE INVENTION

Accordingly, an object of the present invention is to provide an ink suited for ink-jet recording, that has eliminated the problems involved in the prior art discussed above, enables always stable ejection regardless of variations of drive conditions and even in its use for a long period of time, has a superior long-term storage stability, has also eliminated the problem of solidification of ink at nozzle tips of a head, and has particularly superior stability in ink properties.

Another object of the present invention is to provide an ink-jet recording process that enables always stable high-speed recording, and can obtain a recorded image with superior fastness such as water resistance and light fastness when characters or the like are printed on non-coated paper.

Still another object of the present invention is to provide an ink cartridge making use of the ink having the above superior properties, and to provide an ink-jet device and an ink-jet recording apparatus that have superior frequency response and can make a record with a high image quality.

The present invention provides an ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the following expression (I).

$$1.2 \times \frac{DAR}{100} \leq Wr/Wp \leq 15 \times \frac{DAR}{100} \quad (I)$$

wherein DAR denotes a value represented by the following expression (II).

$$DAR = \frac{\text{Minimum weight of water-soluble resin necessary for dispersion of pigment}}{\text{Weight of pigment}} \times 100 \quad (II)$$

The present invention also provides an ink-jet recording process comprising applying a heat energy to an ink to eject said ink from an orifice in the form of ink droplets, and imparting said ink droplets to a recording medium to make a record on said recording medium; said ink comprising the ink as described above.

The present invention still also provides an ink-jet device comprising;

an ink holding member impregnated with the ink as described above; and a head having a plurality of orifices from which said ink is ejected in the form of ink droplets.

The present invention still further provides an ink-jet recording apparatus comprising an ink-jet device comprising;

an ink holding member impregnated with the ink as described above; and a head having a plurality of orifices from which said ink is ejected in the form of ink droplets.

The present invention still further provides an ink cartridge comprising an ink bag impregnated with the ink as described above.

DESCRIPTION OF THE PREFERRED EMBODIMENTS

The ink of the present invention has properties particularly suited for ink-jet printers making use of heat energy.

The ink-jet recording system making use of heat energy utilizes as an ejection energy source a phenomenon of bubbling caused by the bubbling-on-film of a recording solution on a heating resistor formed of a thin film, and is put into practical use by the use of an ink making use of a dye.

In such a system, an ink layer formed on the thin-film heating resistor is presumed to come to have a temperature of from 200° C. to 300° C. or above as an ultimate temperature, though only for a very short time of 3 μsec to 12 μsec per signal. Hence, thermal stability of ink is a very important factor for giving an ejection stability.

The present inventors examined the causes of the serious difficulties in ejection that may occur when the pigment ink as proposed for use in writing materials is used as it is, in the ink-jet recording making use of heat energy. As a result, they found some factors. One of them is that deposits are formed on the thin-film heating resistor because of the heat generated when pulses are applied to such an ink for writing implements, so that the ink is imperfectly bubbled and therefore is irregularly ejected or not ejected. Another factor is that, even if no deposits are formed on the thin-film heating resistor, ink is imperfectly bubbled and therefore the ejection of droplets can not respond to the applied pulses to cause no ejection. Namely, in order to stably eject ink from nozzle tips, the ink must have the performances that it can be bubbled on the thin-film heating resistor to form bubbles with the desired volume and also it can be repeatedly bubbled and debubbled at the desired intervals. None of conventional inks for writing implements, however, have satisfied such performances, and hence various difficulties as stated above may occur when loaded in an ink-jet recording apparatus to carry out recording.

Accordingly, the present inventors further have made intensive studies on performances of inks which are water-based pigment inks, are thermally stable and can be bubbled in an optimum state. As a result, they have discovered that ink can be accurately bubbled on the thin-film heating resistor under any drive conditions and moreover can be always stably ejected without causing the formation of deposits on the thin-film heating resistor even in its use over a long period of time, when a pigment and a water-soluble resin contained in the ink are in a weight proportion falling under the following expression (I) in which the dispersing agent requirement value (herein "DAR value") as defined by the following expression (II) is used.

$$1.2 \times \frac{DAR}{100} \leq Wr/Wp \leq 15 \times \frac{DAR}{100} \quad (I)$$

and preferably, $$2.5 \times \frac{DAR}{100} \leq Wr/Wp \leq 10 \times \frac{DAR}{100} \quad (I)$$

Wp = weight of pigment in ink
Wr = weight of water-soluble resin in ink $$DAR = \frac{\text{Minimum weight of water-soluble resin necessary for dispersion of pigment}}{\text{Weight of pigment}} \times 100 \quad (II)$$

Thus they have accomplished the present invention.

The present invention will be now described below in detail.

The DAR value is measured in the following way.

Figure 6:
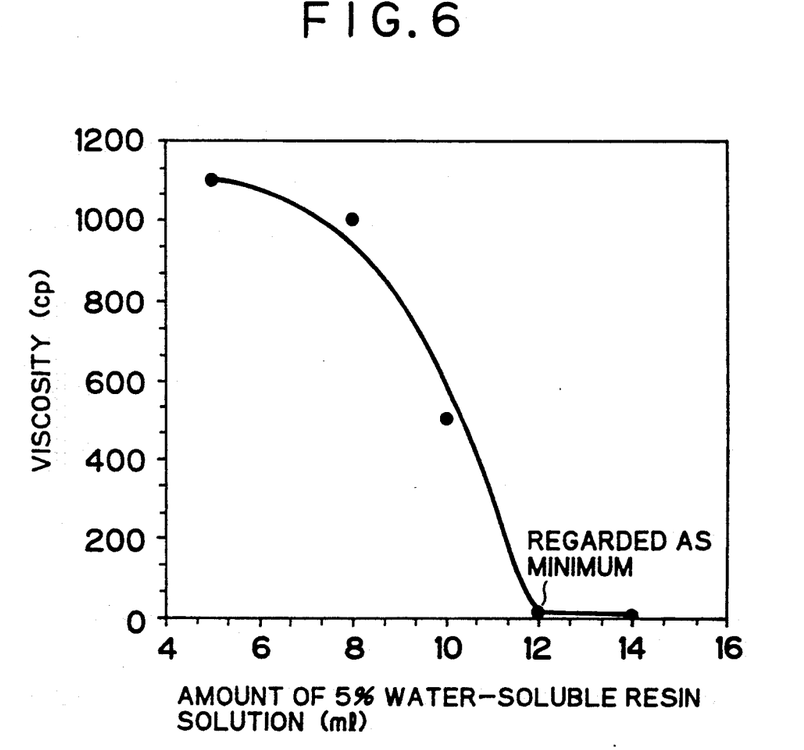
FIG. 6 shows a method by which the DAR value is obtained.

To 100 ml of pure water, 3 ml of 25% ammonia solution is added. While the mixture is stirred at a rotational speed of about 1,500 rpm to about 2,500 rpm using a homogenizer that can be rotated up to 15,000 rpm (for example, T.K. AUTO-HOMOMIXER, manufactured by Tokushukika Kogyo K.K.), 25 g of pigment powder is added. Then, the rotational speed is raised to 8,000 rpm to 12,000 rpm to carry out dispersion until the whole becomes homogeneous. After the sample has become homogeneous, the viscosity of the sample is successively measured while a water-soluble resin solution with a given concentration is dropwise added using a burette. The water-soluble resin solution, when it comprises an alkali-soluble resin, is prepared by dissolving the resin using an aqueous solution containing an amine such as monoethanol amine or diethanol amine, ammonia, or an inorganic base such as NaOH, KOH or LiOH. As long as the water-soluble resin is in a small quantity, the sample solution is a viscous pasty liquid, but, after the water-soluble resin has completely wetted the pigment, it turns to a liquid with a very low viscosity. The DAR value is defined to be a percentage of the proportion of the minimum quantity of water-soluble resin, necessary for making the sample solution into this liquid with a low viscosity, to the amount of the pigment charged. A typical example is shown in FIG. 6. The measuring method described here is a specific example, and it is needless to say that the DAR value as defined in the present invention can be measured on any proportions of different materials and using a different instrument.

As will be clear from the above definition, the DAR value is a value determined by a particular combination of the pigment and the water-soluble resin that are used in the present invention, and the DAR value is by no means in the same value even if the same kind of pigment is used or even if the same kind of water-soluble resin is used.

The pigment used in the present invention may include carbon black such as #2300, #900, MCF88, #33, #40, #45, #52, MA7, MA8, #2200B (all available from Mitsubishi Chemical Industries, Ltd.); RAVEN1255 (available from Columbian Chemicals); REGAL400R, REGAL330R, REGAL660R, MOGUL-L (available from Cabot Corp.); Color Black FW1, Color Black FW18, Color Black SI70, Color Black SI50, Printex 35, Printex U (Degussa, Inc.); and the following known pigments as organic pigments for color printing:

Monoazo yellow pigments as typified by C.I. Pigment Yellow 4, 5, 6, 7, 10, 11, 12, 14, 15, 17, 23, 65.

Red pigments as typified by C.I. Pigment Red 1, 2, 3, 4, 6, 8, 9, 10, 18, 21, 22, 23, 30, 31, 32, 37, 38, 39, 40, 41, 90, 123; C.I. Vat Red 10, 13, 29, 35; C.I. Vat Orange 3, 4, 7, 9, 23; and perylene, quinacridone or thioindigo pigments.

Cyan or violet pigments as typified by C.I. Pigment Blue 15, 17, 22; C.I. Vat Blue 4. 6, 20; C.I. Acid Blue 45; and C.I. Pigment Violet 1, 2, 3, 5, 19, 23.

Any of those prepared afresh for the purpose of the present invention can also be used. The pigment used in the present invention may preferably used in an amount ranging from 3% by weight to 20% by weight, and preferably 2% by weight to 12% by weight. Any of the above pigments may be used in combination of two or more kinds.

The water-soluble resin contained as a dispersing agent for the pigment in the present invention may be any of those soluble in an aqueous solution in which an amine or base has been dissolved. It may preferably be those having a weight average molecular weight ranging from 3,000 to 30,000, and more preferably from 5,000 to 15,000. It may also be used in combination of two or more kinds. It may specifically include a styrene/acrylic acid copolymer, a styrene/acrylic acid-/alkyl acrylate copolymer, a styrene/maleic acid copolymer, a styrene/maleic acid/alkyl acrylate copolymer, a styrene/methacrylic acid copolymer, a styrene/-methacrylic acid/alkyl acrylate copolymer, a styrene-/α-methylstyrene/acrylic acid copolymer, a styrene/α-methylstyrene/acrylic acid/alkyl acrylate copolymer, a styrene/maleic acid half ester copolymer, a vinylnaphthalene/acrylic acid copolymer and a vinylnaphthalene/maleic acid copolymer, or salts of these. The water-soluble resin may preferably be contained in an amount ranging from 0.1% by weight to 5% by weight based on the total weight of ink. It may more preferably be contained in an amount ranging from 0.3% by weight to 2% by weight. If the resin in contained in an amount less than the amount falling under the expression (I) previously described, dispersion stability may become poor to cause sedimentation of the pigment. On the other hand, if the resin is contained in a greater amount, bubbling performance of ink may become poor and also insoluble matters may be deposited on the thin-film heating resistor when pulses are applied, to make it impossible to achieve stable ejection over a long period of time.

Such a water-soluble resin may also be added separately from the dispersing agent when the ink is prepared after dispersion.

The ink of the present invention may preferably have been adjusted to be neutral or alkaline in its entirety. This is desirable since the solubility of the water-soluble resin can be improved to give an ink with much better long-term storage stability. Since, however, in such an instance the ink may cause corrosion of various members used in the ink-jet recording apparatus, its pH should preferably be adjusted to 7 to 10.

A pH adjuster used therefore includes, for example, various organic amines such as diethanol amine and triethanol amine, inorganic alkali agents such as hydroxides of alkali metals as exemplified by sodium hydroxide, lithium hydroxide and potassium hydroxide, organic acids, and mineral acids.

The pigment and water-soluble resin as described above are dispersered or dissolved in an aqueous medium.

The aqueous medium preferable in the ink of the present invention is a mixed solvent of water and a water-soluble organic solvent. As the water, it is preferred to use not usual water containing various ions, but ion-exchanged water (deionized water).

Any other solvent component can be used in combination. The water-soluble organic solvent used in mixture with water includes, for example, alkyl alcohols having 1 to 4 carbon atoms, such as methyl alcohol, ethyl alcohol, n-propyl alcohol, isopropyl alcohol, n-butyl alcohol, sec-butyl alcohol, tertbutyl alcohol, and isobutyl alcohol; amides such as dimethylformamide, and dimethylacetamide; ketones or ketoalcohols such as ketone, and diacetone alcohol; ethers such as tetrahydrofuran, and dioxane; alkylene glycols such as polyethylene glycol, and polypropylene glycol; alkylene glycols whose alkylene group contains 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, such as ethylene glycol monomethyl or -ethyl ether, diethylene glycol monomethyl or -ethyl ether, and triethylene glycol monomethyl or -ethyl ether; and N-methyl-2-pyrrolidone, 1,3-dimethyl-2-imidazolidinone, etc. Of these many water-soluble organic solvents, polyhydric alcohols such as diethylene glycol and lower alkyl ethers of polyhydric alcohols such as triethylene glycol monomethyl or -ethyl ether are preferred.

It has been also discovered that in order to obtain ejection stability, it is effective to add ethanol or isopropyl alcohol in an amount of 3% by weight to 15% by weight. This is presumed to be due to the fact that the addition of any of these solvents enables more stable bubbling of the ink on the thin-film heating resistor. However, addition of any of these solvents in excess may cause the disadvantage that the print quality level of printed lettering is lowered. Thus, an appropriate concentration of any of these solvents has been found to be in the range of 3% by weight to 10% by weight. These solvents, when added to the dispersion, are also effective for preventing foam from occurring at the time of dispersion to make it possible to efficiently carry out dispersion.

The water-soluble organic solvent may be contained in the ink of the present invention usually in an amount ranging from 3% by weight to 50% by weight, preferably from 3% by weight to 40% by weight, of the total weight of the ink. The water may be used in an amount ranging from 10% by weight to 90% by weight, and preferably from 30% by weight to 80% by weight, of the total weight of the ink.

In addition to the above components, a surface active agent, a humectant, an anti-foaming agent, an antiseptic, etc. may be optionally added to the ink of the present invention in order to give an ink having the desired values of physical properties. It is also possible to add a commerically available water-soluble dye.

As the humectant, any of those conventionally used can be used. Preferred are urea, thiourea, and derivatives of these. The humectant may be used preferably in an amount of 2% by weight to 10% by weight, and more preferably 2% by weight to 5% by weight, based on the total weight of the ink.

The surface active agent may include anionic surface active agents such as fatty acid salts, higher alcohol sulfuric acid ester salts, liquid fatty oil sulfuric acid ester salts and alkylallyl sulfonates, and nonionic surface active agents such as polyoxyethylene alkyl ethers, polyoxyethylene alkyl esters and polyoxyethylene sorbitan alkyl esters, which can be used alone or in combination of two or more kinds appropriately selected. The amount of the agent used may vary depending on the dispersing agent. It may preferably be 0.01% by weight to 5% by weight based on the total weight of the ink. When added, the amount of the surface active agent may preferably be so determined that the ink has a surface tension of not less than 30 dyne/cm. This is because, in the recording system as in the present invention, a surface tension smaller than this value may cause troubles such as print twists (defective ink-droplet impacts) due to wetting of nozzle tips. Meanwhile, in order to give an ink having the desired values of physical properties, a water-soluble organic solvent, a pH adjuster, an antifoaming agent, an antiseptic can be added. It is also possible to add a commerically available water soluble dye.

The total amount of both the pigment and water-soluble resin in the dispersant may preferably be not less than 10% by weight and preferably not more than 30% by weight. The reason therefore is that it is impossible to efficiently carry out dispersion to obtain an optimum state of dispersion, unless the pigment and water-soluble resin are present in the dispersion in a given concentration or higher.

The ink of the present invention can be prepared by a method as described below. First, the pigment is added to an aqueous solution containing at least a dispersion resin, an amine (or a base) and water, followed by stirring. Thereafter the mixture is dispersed using the dispersion means as described later, optionally followed by centrifugal separation to give the desired dispersion. Next, the components as described above are added to the resulting dispersion, followed by stirring to give the ink.

For the amine or base that dissolves the resin it is necessary to be added in an amount 1.2 times or more the amount determined by calculation based on the acid value of the resin. This amount can be determined by the following expression.

Amount of amine or base (g) =

$$\frac{\text{Acid value of resin} \times \text{Molecular weight of amine or base} \times \text{Weight of resin (g)}}{56,000}$$

Before the aqueous solution containing the resin is dispersed, it is also necessary to carry out stirring for 30 minutes or more. This procedure improves the wettability of pigment surfaces and promotes adsorption of resin to the pigment surfaces.

The amine added in the dispersion may preferably include organic amines such as monoethanolamine, diethanolamine, triethanolamine, aminomethylpropanol and ammonia. The base may preferably include sodium hydroxide, lithium hydroxide and potassium hydroxide.

As for a dispersion machine used in the present invention, any dispersion machines commonly used can be used, which includes, for example, a ball mill, a roll mill and a sand mill.

In particular, a high-speed type sand mill is preferred, including, for example, Super Mill, Sand Grinder, Beads Mill, Agitator Mill, Grain Mill, DYNO-MILL, Pearl Mill and CoBall-MILL (all trade names).

In the present invention, a pigment having the desired particle size distribution can be obtained by a method including a method in which the grinding media of the dispersion machine are made small in size, a method in which the grinding media are packed at a large proportion, a method in which the treatment time is made longer, a method in which the discharge rate is made slower, and a method in which particles having been pulverized are classified using a filter or a centrifugal separator, which may also include a method comprising a combination of any of these methods.

The ink of the present invention can be particularly preferably used in the ink-jet recording in which recording is carried out by ejecting ink droplets by the action of heat energy. Needless to say, it can also be used for usual writing implements.

The apparatus suited to carry out recording by the use of the ink of the present invention may include an apparatus in which a heat energy corresponding with a recording signal is imparted to the ink held in the interior of a recording head so that ink droplets are generated by the action of the heat energy.

Figure 1A:
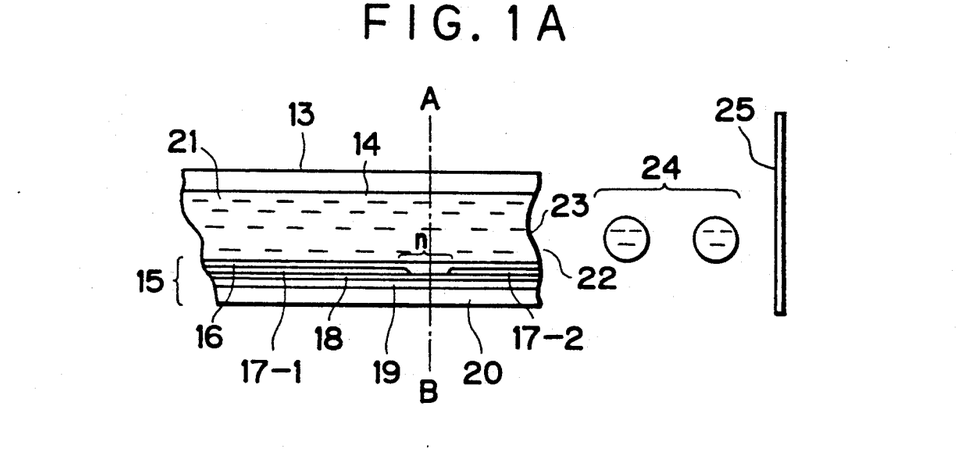
FIGS. 1A and 1B illustrate a longitudinal section and a cross section, respectively, of a head of an ink-jet recording apparatus.
Figure 1B:
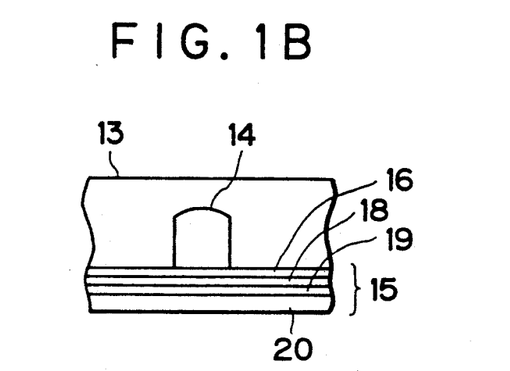
Figure 2:
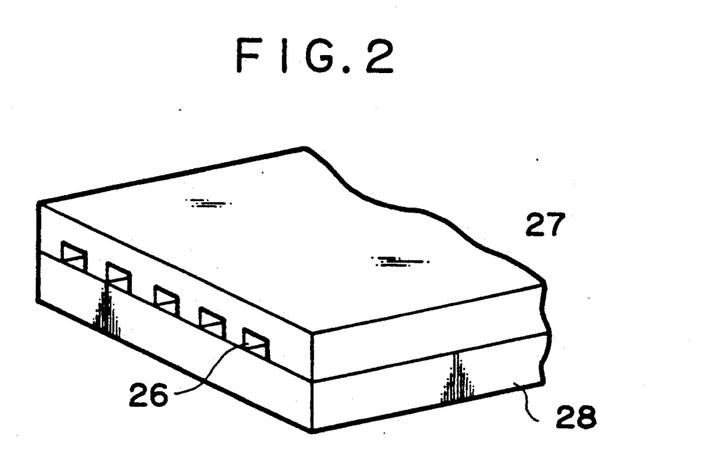
FIG. 2 is a perspective illustration of the appearance of a multiple head comprising the head as shown in FIGS. 1A and 1B.

FIGS. 1A, 1B and 2 show an example of the construction of the head, which is a main component of the apparatus.

A head 13 is formed by bonding a glass, ceramic or plastic plate or the like having a channel 14 through which ink is passed, to a heating head 15 used in thermal recording (the drawing shows a head, to which, however, is not limited). The heating head 15 is comprised of a protective film 16 formed of silicon oxide or the like, aluminum electrodes 17-1 and 17-2, a heating resistor layer 18 formed of nichrome or the like, a heat accumulating layer 19, and a substrate 20 with good heat dissipation properties.

The ink 21 reaches an ejection orifice (a minute opening) 22 and a meniscus 23 is formed there by a pressure P.

Now, upon application of electric signals to the electrodes 17-1 and 17-2, heat is abruptly generated at the region denoted by n in the thermal head 15, so that bubbles are generated in the ink 21 coming into contact with this region. The presure thus produced thrusts out the meniscus 23 and the ink 21 is ejected from the orifice 22 in the form of recording minute drops 24 to fly against a recording medium 25. FIG. 2 illustrates the appearance of a multi-head comprising the head as shown in FIG. 1A arranged in a large number. The multi-head is prepared by closely adhering a glass plate 27 having a multi-channel 26, to a heating head 28 similar to the head as illustrated in FIG. 1A.

FIG. 1A is a longitudinal-sectional view of the head 13 along its ink flow path, and FIG. 1B is a cross-sectional view along the line A-B.

Figure 3:
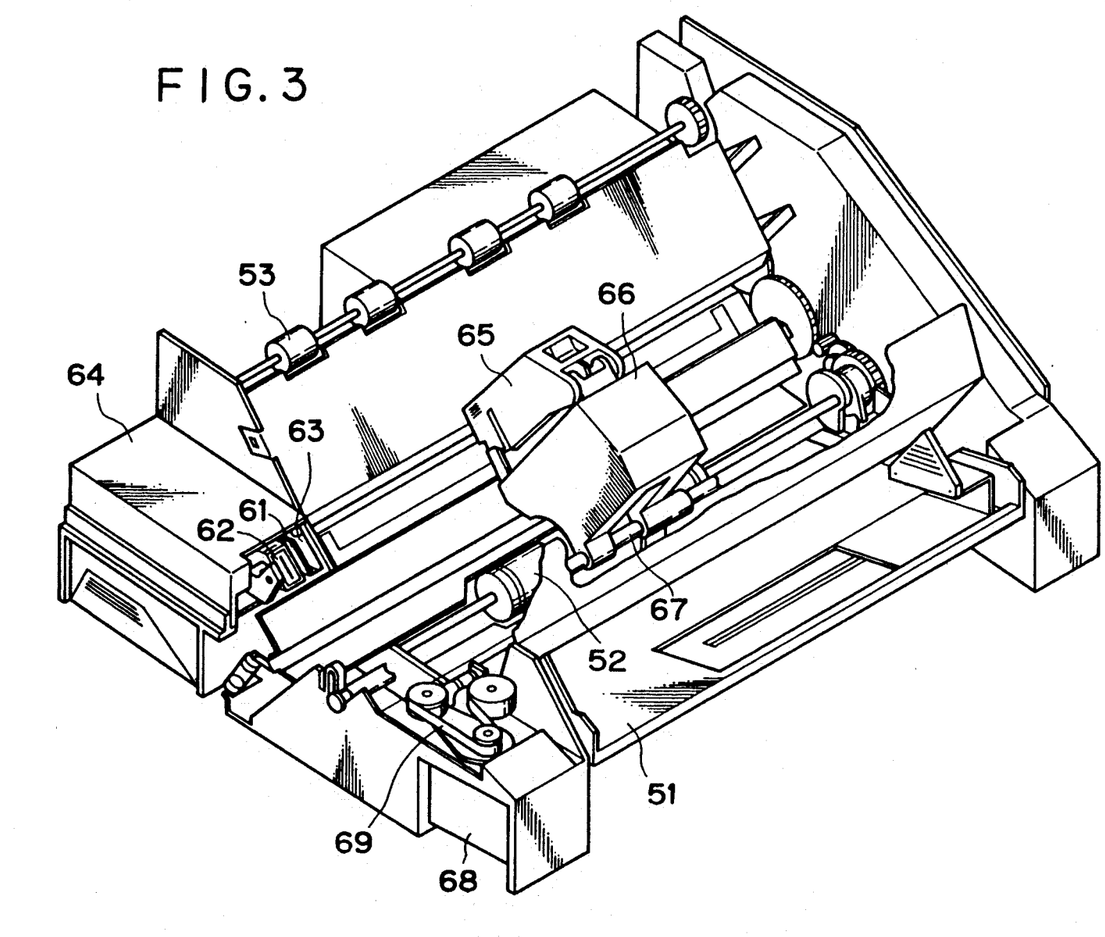
FIG. 3 is a perspective illustration of an example of ink-jet recording apparatus.

FIG. 3 shows an example of an ink-jet recording apparatus in which such a head has been incorporated.

In FIG. 3, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it protrudes into the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it protrudes into the course through which the recording head is moved. The above blade 61, cap 62 and absorber 63 constitute an ejection restoration assembly 64, where the blade 61 and the absorber 63 remove the water, dust or the like from the ink ejection opening face.

Reference numeral 65 denotes the recording head having an ejection energy generating means and ejects ink to the recording medium set opposingly to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 drived by a motor 68. Thus, the carriage 66 can be moved along the guide 67 and hence the recording head 65 can be moved from a recording region to a region adjacent thereto.

Reference numeral 51 denotes a paper feeding part from which recording media are inserted, and 52, a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the head restoration assembly 64 is receded from the moving course of the recording head 65 when the recording head 65 is returned to its home position, e.g., after completion of recording, and the blade 61 stands protruded into the moving course. As a result, the ejection opening face of the recording head 65 is wiped. When the cap 62 comes into contact with the ejection opening face of the recording head 65 to carry out capping, the cap 62 is moved in such a way that it projects into the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
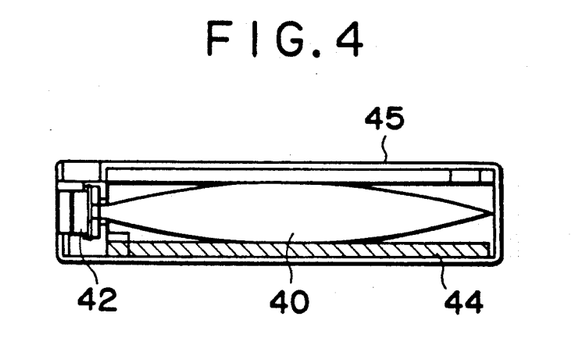
FIG. 4 is a longitudinal section of an ink cartridge.

FIG. 4 shows an example of an ink cartridge, denoted as 45, that has held the ink being fed to the head through an ink-feeding member as exemplified by a tube. Herein reference numeral 40 denotes an ink holder that has held the feeding ink, as exemplified by an ink bag. The top thereof is provided with a stopper 42 made of rubber. A needle (not shown) may be inserted to this stopper 42 so that the ink in the ink holder 40 can be fed to the head. Reference numeral 44 denotes an absorber that receives a waste ink.

It is preferred in the present invention that the ink holder is formed of a polyolefin, in particular, polyethylene, at its surface with which the ink comes into contact.

Figure 5:
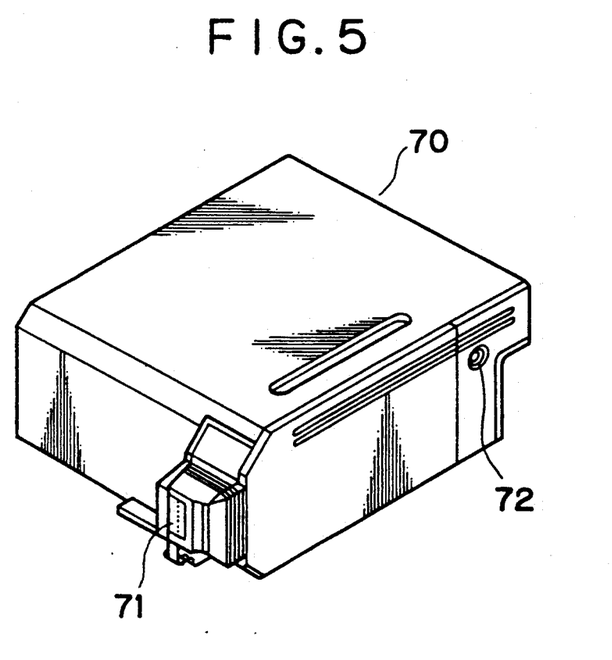
FIG. 5 is a perspective illustration of an ink-jet device.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, reference numeral 70 denotes an ink-jet device, in the interior of which an ink holder that has held an ink, as exemplified by an ink absorber, is contained. The ink-jet device is so constructed that the ink in such an ink absorber is ejected in the form of ink droplets from a head 71 having a plurality of orifices. As a material for the ink absorber, it is preferred in the present invention to use polyurethane.

Reference numeral 72 denotes an air path opening through which the interior of the ink-jet device is made to communicate with the atmosphere.

This ink-jet device 70 can be used in place of the recording head shown in FIG. 3, and is detachably mounted to the carriage 66.

EXAMPLES

The present invention will be described below by giving Examples. In the following, "part(s)" indicates "part(s) by weight".

EXAMPLE 1

A water-soluble resin, styrene/acrylic acid/ethyl acrylate copolymer (acid value 180; average molecular weight: 15,000), serving as a dispersing agent, and carbon black MCF-88 (available from Mitsubishi Chemical Industries, Ltd.) were used. The DAR concerning this water-soluble resin and carbon black was measured according to the method previously described, to reveal that it was 2.5.

| Preparaion of Pigment Dispersion | |
| --- | --- |
| The above water-soluble resin | 3 parts |
| Monoethanolamine | 1.5 parts |
| Ion-exchanged water | 73.5 parts |
| Ethylene glycol | 5 parts |

The above components were mixed, and the mixture was heated to 70° C. using a water bath to completely dissolve the resin component. In this step, there is a possibility that the resin to be dissolved can not be completely dissolved if it is in a low concentration. Accordingly, when the resin is dissolved, a highly concentrated solution may be previously prepared so that it can be diluted to the desired resin solution. To the resulting solution, 15 parts of the above carbon black and 5 parts of ethanol were added, which were premixed for 30 minutes, followed by dispersion under the following conditions:

Dispersion machine:
Sand Grinder (produced by Igarashi Kikai K.K.)
Grinding media: Zirconium beads of 1 mm in diameter
Packing of grinding media: 50% (by volume)
Grinding time: 3 hours.

Centrifugal separation (12,000 rpm; for 40 minutes) was further carried out to remove coarse particles. A dispersion was thus obtained.

| Preparation of Ink | |
|---|---|
| The above dispersion | 50 parts |
| Glycerol | 8 parts |
| Ethylene glycol | 10 parts |
| Ethanol | 4 parts |
| Ion-exchanged water | 28 parts |

The above components were mixed, and stirred for 1 hour to give ink A.

EXAMPLE 2

A water-soluble resin, styrene/α-methylstyrene/acrylic acid/ethyl acrylate copolymer (acid value 168; average molecular weight: 10,100), serving as a dispersing agent, and carbon black MCF-88 (available from Mitsubishi Chemical Industries, Ltd.) were used. The DAR concerning this water-soluble resin and carbon black was measured according to the method previously described, to reveal that it was 2.8.

| Preparation of Pigment Dispersion | |
|---|---|
| The above water-soluble resin | 5 parts |
| Aminomethylpropanol | 2.5 parts |
| Ion-exchanged water | 59.5 parts |
| Diethylene glycol | 5 parts |

The above components were mixed, and the mixture was heated to 70° C. using a water bath to completely dissolve the resin component. To the resulting solution, 20 parts of the above carbon black and 7 parts of ethanol were added, which were premixed for 30 minutes, followed by dispersion under the following conditions:

Dispersion machine: Pearl Mill (produced by Ashizawa)
Grinding media: Glass beads of 1 mm in diameter
Packing of grinding media: 50% (by volume)
Discharge rate: 100 ml/min.

Centrifugal separation (12,000 rpm; for 40 minutes) was further carried out to remove course particles. A dispersion was thus obtained.

| Preparation of Ink | |
|---|---|
| The above dispersion | 40 parts |
| Glycerol | 10 parts |
| Ethylene glycol | 5 parts |
| Ethanol | 5 parts |
| Ion-exchanged water | 40 parts |

The above components were mixed, and stirred for 1 hour to give ink B.

EXAMPLE 3

A water-soluble resin, styrene/acrylic acid/ethyl acrylate copolymer (acid value 138; average molecular weight: 5,600), serving as a dispersing agent, and carbon black S170 (available from Degussa, Inc) were used. The DAR concerning this water-soluble resin and carbon black was measured according to the method previously described, to reveal that it was 7.5.

| Preparation of Pigment Dispersion | |
|---|---|
| The above water-soluble resin | 8 parts |
| Aminomethylpropanol | 4 parts |
| Ion-exchanged water | 56 parts |
| Diethylene glycol | 5 parts |

The above components were mixed, and the mixture was heated to 70° C. using a water bath to completely dissolve the resin component. To the resulting solution, 20 parts of the above carbon black and 7 parts of ethanol were added, which were premixed for 30 minutes, followed by dispersion under the following conditions:

Dispersion machine: Pearl Mill (produced by Ashizawa)
Grinding media: Glass beads of 1 mm in diameter
Packing of grinding media: 50% (by volume)
Discharge rate: 100 ml/min.

Centrifugal separation (12,000 rpm; for 40 minutes) was further carried out to remove course particles. A dispersion was thus obtained.

| Preparation of Ink | |
|---|---|
| The above dispersion | 40 parts |
| Glycerol | 6 parts |
| Ethylene glycol | 10 parts |
| Ethanol | 5 parts |
| Ion-exchanged water | 39 parts |

The above components were mixed, and stirred for 1 hour to give ink C.

EXAMPLE 4

A water-soluble resin, styrene/acrylic acid/ethyl acrylate copolymer (acid value 120; average molecular weight: 3,700), serving as a dispersing agent, and carbon black MOGUL-L (available from Cabot Corp.) were used. The DAR concerning this water-soluble resin and carbon black was measured according to the method previously described, to reveal that it was 2.8.

| Preparation of Pigment Dispersion | |
|---|---|
| The above water-soluble resin | 2 parts |
| Monoethanolamine | 1 part |
| Ion-exchanged water | 72 parts |
| Ethylene glycol | 5 parts |

The above components were mixed, and the mixture was heated to 70° C. using a water bath to completely dissolve the resin component. To the resulting solution, 15 parts of the above carbon black and 15 parts of ethanol were added, which were premixed for 30 minutes, followed by dispersion under the following conditions:
Dispersion machine:
Sand Grinder (produced by Igarashi Kikai K.K.)
Grinding media: Zirconium beads of 1 mm in diameter
Packing of grinding media: 50% (by volume)
Grinding time: 3 hours.
Centrifugal separation (12,000 rpm; for 40 minutes) was further carried out to remove course particles. A dispersion was thus obtained.

| Preparation of Ink | |
|---|---|
| The above dispersion | 40 parts |
| Ethylene glycol | 20 parts |
| Ethanol | 4 parts |
| Ion-exchanged water | 36 parts |

The above components were mixed, and stirred for 1 hour to give ink D.

EXAMPLE 5

A water-soluble resin OROTAN SN (available from Rohm & Haas Co.), serving as a dispersing agent, and carbon black MOGUL-L (available from Cabot Corp.) were used. The DAR concerning this water-soluble resin and carbon black was measured according to the method previously described, to reveal that it was 2.8.

| Preparation of Pigment Dispersion | |
|---|---|
| The above water-soluble resin | 3 parts |
| Monoethanolamine | 1.5 parts |
| Ion-exchanged water | 73.5 parts |
| Ethylene glycol | 5 parts |

The above components were mixed, and the mixture was heated to 70° C. using a water bath to completely dissolve the resin component. In this step, there is a possibility that the resin to be dissolved can not be completely dissolved if it is in a low concentration. Accordingly, when the resin is dissolved, a highly concentrated solution may be previously prepared so that it can be diluted to the desired resin solution. To the resulting solution, 15 parts of the above carbon black and 5 parts of ethanol were added, which were premixed for 30 minutes, followed by dispersion under the following conditions:
Dispersion machine:
Sand Grinder (produced by Igarashi Kikai K.K.)
Grinding media: Zirconium beads of 1 mm in diameter
Packing of grinding media: 50% (by volume)
Grinding time: 3 hours.
Centrifugal separation (12,000 rpm; for 40 minutes) was further carried out to remove course particles. A dispersion was thus obtained.

| Preparation of Ink | |
|---|---|
| The above dispersion | 50 parts |
| Glyoerol | 8 parts |
| Ethylene glycol | 10 parts |
| Ethanol | 4 parts |
| Ion-exchanged water | 28 parts |

The above components were mixed, and stirred for 1 hour to give ink E.

EXAMPLES 6 AND 7

A water-soluble resin, styrene/acrylic acid copolymer (acid value 155; weight average molecular weight: 11,500), serving as a dispersing agent was used. A red pigment, Sumitomo Fast Red 3BR (C.I. Vat Red 29) or Fuji Pyrazolone Red (C.I. Pigment Red 38) was also used. The DAR concerning the water-soluble resin and each red pigment was measured to reveal that it was 0.8 and 0.4, respectively.

| Preparation of Pigment Dispersion | |
|---|---|
| The above water-soluble resin | 0.5 part |
| Monoethanolamine | 0.25 part |
| Ion-exchanged water | 75 parts |
| Ethylene glycol | 5.0 parts |

The above components were mixed and dissolved. To the resulting solution, 15 parts of the above red pigment and 5 parts of ethanol were added, which were premixed for 30 minutes, followed by dispersion and centrifugal separation in the same manner as in Example 1.

| Preparation of Ink | |
|---|---|
| The above dispersion | 50 parts |
| Glycerol | 8 parts |
| Ethylene glycol | 10 parts |
| Ethanol | 4 parts |
| Ion-exchanged water | 28 parts |

The above components were mixed, and stirred for 1 hour to give ink F making use of Sumitomo Fast Red 3BR and ink G making use of Fuji Pyrazolone Red.

COMPARATIVE EXAMPLE 1

Ink H was obtained in the same manner as in Example 1 except that the water-soluble resin, monoethanolamine and ion-exchanged water contained in the dispersion were used in amounts of 6 parts, 3 parts and 69 parts, respectively.

COMPARATIVE EXAMPLE 2

Ink I was obtained in the same manner as in Example 2 except that the water-soluble resin, aminomethylpropanol, carbon black and ion-exchanged water contained in the dispersion were used in amounts of 7 parts, 3.5 parts, 15 parts and 62.5 parts, respectively.

Using respectively the above inks, and also using a printer, (A) a Think-Jet printer (produced by HP Co.; drive frequency: 1.2 kHz), (B) a Desk Jet printer (produced by HP Co.; drive frequency: 3.6 kHz) or (C) a modified machine of BJ-130 (produced by Canon Inc.), of the type a heat energy is applied to eject ink, the following performance was evaluated. Results obtained are shown in Table 1.

T1: Drive conditions and ejection stability

With regard to the printer (C), drive voltage was set to 25 V, 27 V or 30 V. Characters were printed at room temperature under conditions of two kinds of frequency, 2 kHz and 4 kHz, for each voltage. Occurrence of print disorder, characters with unsharp edges or ejection failure (non-ejection) was examined to evaluate ejection stability.

AA: Clear ejection on the first and subsequent characters. Ejection failure, characters with unsharp edges and print disorder are not seen at all in the course of continuous printing.

A: Clear ejection on the part of characters, but with several ejection failures observed at the part of solid prints.

B: Ejection failure occurs even on the part of characters after continuous printing of several characters.

C: Serious ejection disorder occurs on the first and subsequent characters, and printed characters are illegible.

T2: Measurement of DAR

To 100 ml of pure water, 3 ml of 25% ammonia solution is added. While the mixture is stirred at a rotational speed of about 1,500 rpm to about 2,500 rpm using T.K. AUTO-HOMOMIXER, manufactured by Tokushukika Kogyo K.K.), 25 g of pigment powder is added. Then, the rotational speed is raised to 8,000 rpm to 12,000 rpm to carry out dispersion until the whole becomes homogeneous. After the sample has become homogenous, the viscosity of the sample is successively measured with an E-type viscometer while a water-soluble resin solution with a concentration of 5% by weight is dropwise added using a burette. The water-soluble resin is optionally dissolved in pure water to which monoethanol amine has been added in a neutralization amount calculated from acid value, to previously prepare a water-soluble resin solution. As long as the water-soluble resin is in a small quantity, the sample solution is a viscous pasty liquid, but, after the water-soluble resin has completely wetted the pigment, it turns to a liquid with a very low viscosity. The minimum quantity of water-soluble resin, necessary for making the sample solution into this liquid with a low viscosity is determined, and the DAR is measured according to the expression (II) previously described.

T3: Storage stability

Using all the inks A to J, 100 ml of each ink was put in a pressure glass container made of borosilicate glass. After the container was hermetically stoppered, the ink was stored at 60° C. for 3 months. After the lapse of 3 months, the presence or absence of sediment at the bottom of the container was examined.

TABLE 1

| Test: Sample | Printer: (A) | (B) | T1 (C) 2 KHz 25V | 27V | 30V | 4 KHz 25V | 27V | 30V | T2 | Wr/Wp in ink | Range of Wr/Wp according to expression (II) | T3 Occurrence of sediment |
|---|---|---|---|---|---|---|---|---|---|---|---|---|
| Example: | | | | | | | | | | | | |
| 1 | AA | AA | AA | AA | AA | AA | AA | AA | 2.5 | 0.13 | 0.03 to 0.375 | No |
| 2 | AA | AA | AA | AA | AA | AA | AA | AA | 2.8 | 0.15 | 0.036 to 0.42 | No |
| 3 | AA | AA | AA | AA | AA | AA | AA | AA | 7.5 | 0.32 | 0.09 to 0.6 | No |
| 4 | AA | AA | AA | AA | AA | AA | AA | AA | 2.8 | 0.09 | 0.036 to 0.42 | No |
| 5 | AA | AA | AA | AA | AA | AA | AA | AA | 2.8 | 0.13 | 0.036 to 0.42 | No |
| Comparative Example: | | | | | | | | | | | | |
| 1 | C | C | C | C | B | C | C | C | 2.5 | 0.45 | 0.03 to 0.375 | Yes |
| 2 | B | C | C | C | B | C | C | C | 2.8 | 0.53 | 0.036 to 0.42 | Yes |
| Example: | | | | | | | | | | | | |
| 6 | AA | AA | AA | AA | AA | AA | AA | AA | 0.8 | 0.027 | 0.0096 to 0.12 | No |
| 7 | AA | AA | AA | AA | AA | AA | AA | AA | 0.4 | 0.030 | 0.0048 to 0.06 | No |

As having been described above, the ink of the present invention has the effect as follows: When used in ink-jet printers, it causes no solidification of ink at the nozzle tips of a head even after it has been left for a long time and can give a superior fastness of printed lettering. In addition, it can give printed lettering with a high density, and enables always stable ejection of ink even under variation of drive conditions or when used for a long time, and also promises excellent reliability and long-term storage stability.

What is claimed is:

1. An ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the expression (I)

$$1.2 \times \frac{DAR}{100} \leq Wr/Wp \leq 15 \times \frac{DAR}{100} \quad (I)$$

wherein DAR denotes a value represented by the expression (II)

$$DAR = \frac{\text{Minimum weight of water-soluble resin necessary for dispersion of pigment}}{\text{Weight of pigment}} \times 100. \quad (II)$$

2. The ink according to claim 1, wherein said liquid medium comprises a polyhydric alcohol and/or an alkyl ether thereof, an aliphatic monohydric alcohol, and water.

3. The ink according to claim 2, wherein said aliphatic monohydric alcohol is ethyl alcohol or isopropyl alcohol.

4. The ink according to claim 2, wherein said aliphatic monohydric alcohol is contained in an amount of from 3% by weight to 15% by weight based on the total weight of the ink.

5. The ink according to claim 2, wherein said polyhydric alcohol and/or said alkyl ether thereof is contained in an amount of from 10% by weight to 50% by weight based on the total weight of the ink.

6. The ink according to claim 1, wherein said Wr/Wp satisfies the expression (III)

$$2.5 \times \frac{DAR}{100} \leq Wr/Wp \leq 10 \times \frac{DAR}{100} \quad \text{(III)}$$

wherein Wp, Wr and DAR are as defined in claim 1.

7. An ink-jet recording process comprising applying a heat energy to an ink to eject said ink from an orifice in the form of ink droplets, and imparting said ink droplets to a recording medium to make a record on said recording medium; said ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the expression (I)

$$1.2 \times \frac{DAR}{100} \leq Wr/Wp \leq 15 \times \frac{DAR}{100} \quad \text{(I)}$$

wherein DAR denotes a value represented by the expression (II)

$$DAR = \frac{\text{Minimum weight of water-soluble resin necessary for dispersion of pigment}}{\text{Weight of pigment}} \times 100. \quad \text{(II)}$$

8. The ink-jet recording process according to claim 7, wherein said recording medium comprises a noncoated paper.

9. The ink-jet recording process according to claim 7, wherein said liquid medium in said ink comprises a polyhydric alcohol and/or an alkyl ether thereof, an aliphatic monohydric alcohol, and water.

10. The ink-jet recording process according to claim 9, wherein said aliphatic monohydric alcohol is ethyl alcohol or isopropyl alcohol.

11. The ink-jet recording process according to claim 9, wherein said aliphatic monohydric alcohol is contained in an amount of from 3% by weight to 15% by weight based on the total weight of the ink.

12. The ink-jet recording process according to claim 9, wherein said polyhydric alcohol and/or said alkyl ether thereof is contained in an amount of from 10% by weight to 50% by weight based on the total weight of the ink.

13. The ink-jet recording process according to claim 7, wherein said Wr/Wp satisfies the expression (III)

$$2.5 \times \frac{DAR}{100} \leq Wr/Wp \leq 10 \times \frac{DAR}{100} \quad \text{(III)}$$

wherein Wp, Wr and DAR are as defined in claim 7.

14. An ink-jet device comprising;
an ink holding member impregnated with an ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the expression (I)

$$1.2 \times \frac{DAR}{100} \leq Wr/Wp \leq 15 \times \frac{DAR}{100} \quad \text{(I)}$$

wherein DAR denotes a value represented by the expression (II)

$$DAR = \frac{\text{Minimum weight of water-soluble resin necessary for dispersion of pigment}}{\text{Weight of pigment}} \times 100; \quad \text{(II)}$$

and a head having a plurality of orifices from which said ink is ejected in the form of ink droplets.

15. The ink-jet device according to claim 14, wherein said ink holding member is an ink absorber or an ink bag.

16. The ink-jet device according to claim 14, wherein said head has a heating head to provide to said ink a heat energy for ejecting ink droplets.

17. The ink-jet device according to claim 14, wherein said Wr/Wp satisfies the expression (III)

$$2.5 \times \frac{DAR}{100} \leq Wr/Wp \leq 10 \times \frac{DAR}{100} \quad \text{(III)}$$

wherein Wp, Wr and DAR are as defined in claim 14.

18. An ink-jet recording apparatus comprising an ink-jet device comprising;
an ink holding member impregnated with an ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the expression (I)

$$1.2 \times \frac{DAR}{100} \leq Wr/Wp \leq 15 \times \frac{DAR}{100} \quad \text{(I)}$$

wherein DAR denotes a value represented by the expression (II)

$$DAR = \frac{\text{Minimum weight of water-soluble resin necessary for dispersion of pigment}}{\text{Weight of pigment}} \times 100; \quad \text{(II)}$$

and a head having a plurality of orifices from which said ink is ejected in the form of ink droplets.

19. The ink-jet recording apparatus according to claim 18, wherein said ink holding member is an ink absorber or an ink bag.

20. The ink-jet recording apparatus according to claim 18, wherein said head has a heating head to provide to said ink a heat energy for ejecting ink droplets.

21. The ink-jet recording apparatus according to claim 18, wherein said Wr/Wp satisfies the expression (III)

$$2.5 \times \frac{DAR}{100} \leq Wr/Wp \leq 10 \times \frac{DAR}{100} \quad \text{(III)}$$

wherein Wp, Wr and DAR are as defined in claim 18.

22. An ink cartridge comprising an ink bag impregnated with an ink comprising a composition containing a pigment, a water-soluble resin and a liquid medium, wherein the pigment and the water-soluble resin are contained in said composition in a proportion of the weight Wr of the latter to the weight Wp of the former, Wr/Wp, that satisfies the expression (I)

$$1.2 \times \frac{DAR}{100} \leq Wr/Wp \leq 15 \times \frac{DAR}{100} \quad (I)$$

wherein DAR denotes a value represented by the expression (II)

$$DAR = \frac{\text{Minimum weight of water-soluble resin necessary for dispersion of pigment}}{\text{Weight of pigment}} \times 100. \quad (II)$$

23. The ink cartridge according to claim 22, wherein said liquid medium in said ink comprises a polyhydric alcohol and/or an alkyl ether thereof, an aliphatic monohydric alcohol, and water.

24. The ink cartridge according to claim 23, wherein said aliphatic monohydric alcohol is ethyl alcohol or isopropyl alcohol.

25. The ink cartridge according to claim 23, wherein said aliphatic monohydric alcohol is contained in an amount of from 3% by weight to 15% by weight based on the total weight of the ink.

26. The ink cartridge according to claim 23, wherein said polyhydric alcohol and/or said alkyl ether thereof is contained in an amount of from 10% by weight to 50% by weight based on the total weight of the ink.

27. The ink cartridge according to claim 22, wherein said Wr/Wp satisfies the expression (III)

$$2.5 \times \frac{DAR}{100} \leq Wr/Wp \leq 10 \times \frac{DAR}{100} \quad (III)$$

wherein Wp, Wr and DAR are as defined in claim 22.

* * * * *

UNITED STATES PATENT AND TRADEMARK OFFICE
CERTIFICATE OF CORRECTION

PATENT NO. : 5,172,133
DATED : December 15, 1992
INVENTOR(S) : Suga et al.

It is certified that error appears in the above-identified patent and that said Letters Patent is hereby corrected as shown below:

COLUMN 2:

Line 5, "but" should be deleted; and "experienced" should read --have experienced--.

COLUMN 5:

Line 34, "preferably" should read --preferably be--.

COLUMN 10:

Line 18, "to" should read --into--.

COLUMN 11:

Line 62, "course" should read --coarse--.

COLUMN 12:

Line 39, "course" should read --coarse--.

UNITED STATES PATENT AND TRADEMARK OFFICE
CERTIFICATE OF CORRECTION

PATENT NO. : 5,172,133
DATED : December 15, 1992
INVENTOR(S) : Suga et al.

It is certified that error appears in the above-identified patent and that said Letters Patent is hereby corrected as shown below:

COLUMN 13:

Line 14, "course" should read --coarse--; and
  Line 61, "course" should read --coarse--.

COLUMN 15:

Line 44, "manufactured" should read --(manufactured--.

COLUMN 17:

Line 29, "noncoated" should read --non-coated--; and
  Line 54, "comprising;" should read --comprising:--.

COLUMN 18:

Line 24, "comprising;" should read --comprising:--.

Signed and Sealed this

Eleventh Day of January, 1994

Attest:

BRUCE LEHMAN

*Attesting Officer*  *Commissioner of Patents and Trademarks*